United States Patent [19]
Umezawa et al.

[11] Patent Number: 5,580,100
[45] Date of Patent: Dec. 3, 1996

[54] CONNECTING JOINT FOR PLASTIC TUBE

[75] Inventors: Katsushi Umezawa, Numazu; Kazumi Fukaya; Tsuyoshi Aoki, both of Mishima, all of Japan

[73] Assignee: Usui Kokusai Sangyo Kaisha Ltd., Japan

[21] Appl. No.: 394,623

[22] Filed: Feb. 27, 1995

[30] Foreign Application Priority Data

Feb. 25, 1994 [JP] Japan .................................. 6-053224

[51] Int. Cl.$^6$ .................................................. F16L 35/00
[52] U.S. Cl. ............................ 285/39; 285/308; 285/323
[58] Field of Search .................................. 285/322, 323, 285/308, 39

[56] References Cited

U.S. PATENT DOCUMENTS

| | | | |
|---|---|---|---|
| 3,743,326 | 7/1973 | Courtot et al. | 285/323 X |
| 4,188,051 | 2/1980 | Burge | 285/323 X |
| 4,304,426 | 12/1981 | Francis | 285/323 |
| 4,712,813 | 12/1987 | Passerell | 285/323 X |
| 4,747,626 | 5/1988 | Hama et al. | 285/308 |

Primary Examiner—Dave W. Arola
Attorney, Agent, or Firm—Anthony J. Casella; Gerald E. Hespos

[57] ABSTRACT

A connecting joint for connection to a plastic tube comprising: a main body having proximal and distal ends with a flow passage and chamber between the ends in communication with each other. An engaging wall extends inwardly at the distal end defining a small diameter entry into the chamber, a support provided with a guard wall and resilient arms extending from the guard wall with projection walls on the terminal ends of the resilient arms having outwardly extending inclined surfaces and inwardly extending pawl walls is located in the chamber and a collar is secured in the chamber by the engaging walls. When the tube is inserted into the chamber, one of the guard wall, an annular friction ring or a seal located in the chamber engages the tube and as the tube is withdrawn the member engaging the tube moves the outwardly extending inclined surfaces into engagement with the collar thereby urging the pawls into engagement with the tube. A releasing component is include which releases the pawl walls from engagement with the tube.

9 Claims, 5 Drawing Sheets

CONNECTING JOINT FOR PLASTIC TUBE

BACKGROUND OF THE INVENTION

1. Field of the Invention

This invention is generally related to soft and flexible plastic tubes having a relatively small diameter of less than 20 mm and thin wall thickness of less than 2.0 mm; said tubes will be deposited as an oil or air supplying passage in vehicles or various types of machines and equipments, and more particularly, this invention relates to an onetouch connecting joint.

2. Description of the Prior Art

Various types of conventional onetouch connecting joints have been developed and disclosed. The majority of them is constructed with a resilient supporting material, such as rubber, which is installed inside the joining main body, and a pawl wall is projected on a portion of the internal peripheral surface. With this structure, the pawl wall portion will be expanded by engaging the plastic tubes externally to said supporting material, so that the pawl wall portion will be forced to be inserted into the outer peripheral surface of the tube to make a firm connection.

However, with the aforementioned conventional methods, since the connection is achieved by simply inserting the soft and resilient plastic tubes into the pawl wall, the insertion on the pawl wall portion could be unnecessarily extended due to the facts that (i) the plastic tubes will be thinned due to an expansion along the tensile direction when an external force is applied to pull them out or (ii) the tubes will be expanded if a high flow pressure is applied on their internal surfaces. These facts will adversely affect the tubes to produce local cracks or fracture thereon due to deterioration of connecting force. This will result in unstable supporting force on the supporting portion and connecting activity as well.

OBJECTS AND SUMMARY OF THE INVENTION

All of the foregoing have resulted in the requirement for connecting joint like the one of the present invention. It is an object of the present invention to provide a connecting joint for the plastic tubes with which a stable connecting joint can be always achieved with a constant supporting force by means of controlling the undesired thinning of wall thickness of the plastic tubes and/or excess expansion of the pawl wall portion when the tubes expand, so that the occurrence of local cracks or fracture of the tubes can be avoided.

In order to achieve the aforementioned objective of the present invention, a small diameter chamber (in which the diameter thereof is gradually enlarged stepwise), an intermediate chamber, and a large diameter chamber will be deposited, in this sequence, around the flow passage inside the shaft core portion. The connecting joint for the plastic tubes is composed of the following four major components: a joining main body, a resilient sealing component, a supporting component, and a collar component. The joining main body possesses a rear end peripheral portion with the large diameter chamber as an engaging wall. The resilient sealing component, which is positioned at the intermediate chamber, has a ring shape and it is inserted between the outer peripheral surface of the plastic tubes to be connected and the inner peripheral surface of said intermediate chamber. Inside the supporting chamber, a ring-formed guard wall and a projection wall are deposited in such a way that they can slide along the direction of the shaft core; said ring-formed guard wall is installed at the distal end portion of the collet-shaped cylindrical arm having a slit which is positioned on the opposite side of the sealing component and has an outer diameter which is slightly smaller than the inner diameter of the intermediate chamber. The projection wall has a ring-formed pawl wall at its proximal end portion, and it has an outer peripheral side with a gradually reduced diameter inclined face and an inner peripheral side which has an open inclined face at the end portion thereof. In the collar component, the rear end portion is an engaging portion with the engaging wall of said joining main body at the large diameter chamber, and a portion having steps is also provided at the inner periphery in order for the projection portion of said supporting component to slide in contact on the open inclined face. Moreover, the connecting joint is constructed by a friction ring. The friction ring is deposited in such a way that the inner peripheral surface of the ring-formed guard wall is provided in contact with the outer peripheral surface of the plastic tubes to be connected with a certain value of sliding friction coefficient, and the ring-formed pawl wall is provided in non-contact with the outer peripheral surface of the plastic tubes to be connected. At the same time, the inner peripheral surface of the ring-formed guard wall and the ring-formed pawl wall are deposited in non-contact with the outer peripheral surface of the plastic tubes to be connected and in contact with the outer peripheral surface of the plastic tubes to be connected between the resilient sealing component and the ring-formed guard wall in a certain value of sliding friction coefficient. In an alternative manner, the connecting joint can be constructed in such a way that the resilient sealing component is deposited in contact with the outer peripheral surface of the plastic tubes to be connected in a certain value of coefficient of sliding friction, and a pressing wall is installed to release the insertion at the pawl wall by pressing the open inclined face of the supporting component by moving toward the shaft core direction by means of passing the insertion hole of the plastic tubes to the shaft core and forming the step portion being engaged with the portion having steps in the collar component and it distal end portion to be gradually thinning inclined surface. At the same, a releasing component having a pawl wall—which projects outwardly at the rear end side—is deposited inside the collar component; on the other hand, a cylinder receiving component is deposited through the small diameter chamber, the intermediate chamber, and the large diameter chamber. Furthermore, in an alternative manner, a slit is installed over the pressing wall component forming the releasing component, or a ring-formed dust sealing component is deposited at an engaging portion between the component having steps in the collar component and the step component.

According to the present invention with the structure as described in the above, the aforementioned thinning at the tube side or excess insertion at the pawl wall side during an expansion process can be effectively avoided by a contact mechanism of the collet-shaped cylindrical arm component which is connecting to the pawl wall in the supporting component at the outer peripheral surface of the plastic tubes. Moreover, by the mechanical action of the cylindrical arm component and the displacement at the insertion portion sliding to the shaft core component, local cracks and fracture at the insertion portion can be prevented so that a constant supporting force at the supporting component and a stable connection can be achieved.

Furthermore, even if the internal fluid happens to flow from the location between the inner peripheral surface of the small diameter chamber in the joining main body and the cylinder receiving component or the outer peripheral surface of the plastic tubes into the intermediate portion in front of the resilient sealing component, the sealing component will move to the axial direction in the large diameter chamber under a pressure of flowing fluid media, so that the supporting component will also move toward the same direction because it is pressed by the supporting component. By the movement of the supporting component, the gradually thinning inclined surface moves then slidably to perform a more secure contact-sliding against the opening inclined face in the collar component, so that a large frictional force can be developed to contact the cylindrical arm tightly against the outer peripheral surface, and the ring-formed pawl wall is furthermore inserted into the outer peripheral surface of the plastic tubes to achieve more secure supporting force of the plastic tubes.

Moreover, by the insertion action of the plastic tubes into the joining main body and the frictional force developed by the tight contact at the inner surface of the ring-formed pawl wall, the inner surface of the friction ring, the inner surface of the sealing component, and the outer surface of the plastic tubes; the non-contact situation can be remained between the inner surface of the ring-formed pawl wall and the outer surface of the plastic tubes. This mechanism results in that the wear scratchs on the outer surface of the plastic tubes can be avoided, so that undesired reduction of the effective sealing can also be avoided.

DETAILED DESCRIPTION OF THE PREFERRED EMBODIMENT

Figure 1:
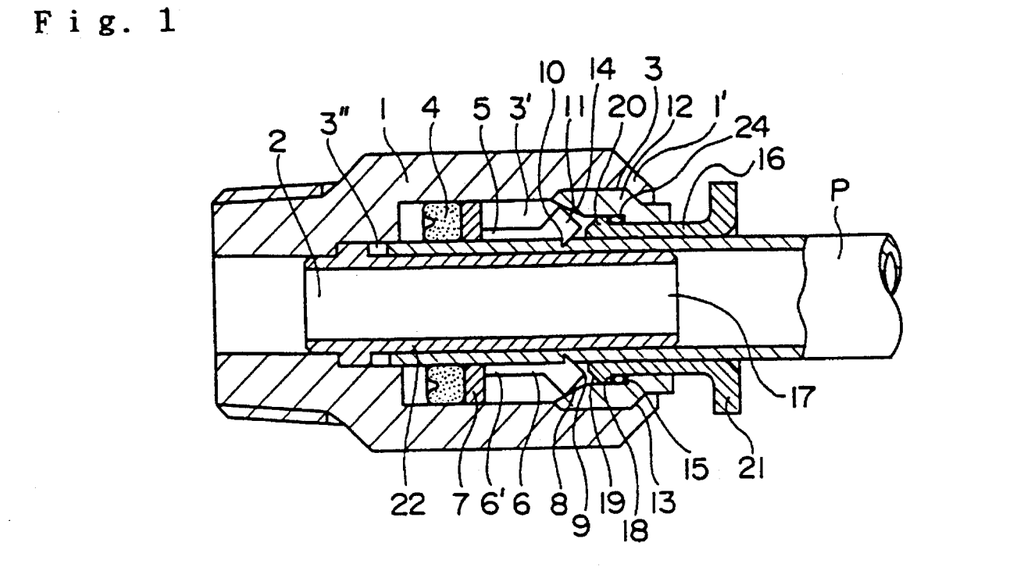
FIG. 1 is a vertical cross sectional view illustrating a connecting situation of the plastic tubes according to the first embodiment of the present invention.
Figure 2:
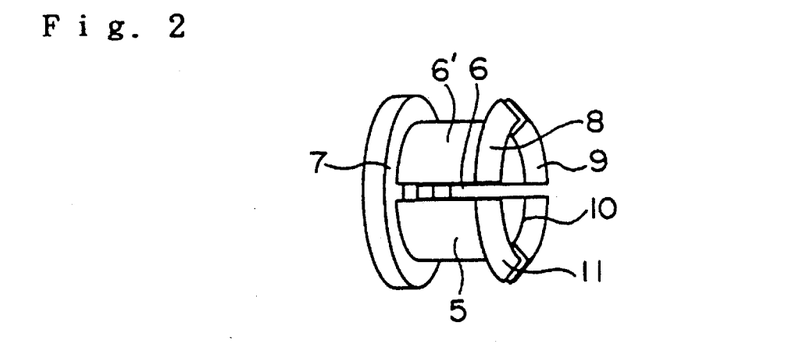
FIG. 2 is a perspective view of the supporting component of FIG. 1.
Figure 3:
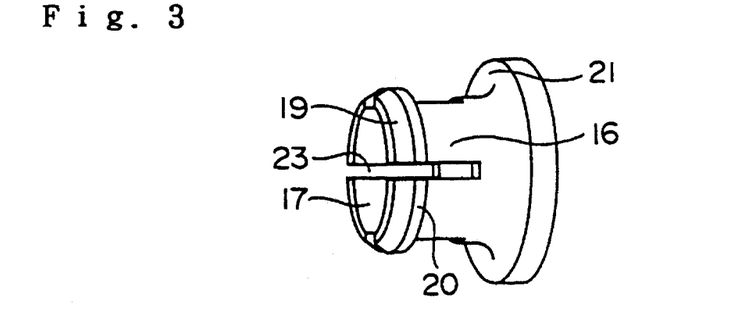
FIG. 3 is a perspective view of the releasing component of the FIG. 1.

According to FIGS. 1 through 3, there is a joining main body (1) made of plastic or metallic material. A small diameter chamber (3"), an intermediate chamber (3'), and a large diameter chamber (3) are connected to each other in this sequence toward the distal end portion (or connecting portion) of the main body around the flow passage hole (2) inside the shaft core portion, in order to form the distal end peripheral portion of the large diameter chamber as an engaging wall ($1_\lambda^{1'''}$). A ring-formed resilient component (4) which is made from metallic material, rubber or plastic material is deposited in the intermediate chamber (3') of the joining main body (1) and is inserted between the outer peripheral face of the soft plastic tubes to be connected (P) and the inner surface of the intermediate chamber. There is also a supporting component (5), in which a ring-formed guard wall (7) is deposited at the distal end portion of a collet shaped cylindrical arm (6') which forms the outer surface side as a gradually thinning inclined surface (8) at its rear end portion, and the inner surface as an opening inclined surface (9). This way a projection wall (11) can be formed in which a ring-formed pawl wall (10) is engaging the outer peripheral surface of the plastic tube (P) near its proximal end portion. The inner diameter of said cylindrical arm (6') is fabricated to be slightly larger than the outer diameter of the plastic tube (P), and the outer diameter of the guard wall (7) is fabricated to be slightly smaller than the inner diameter of the intermediate chamber (3'), so it can slide along the direction of the shaft core. There is also a collar component (12) which is deposited on the large diameter chamber (3). Its rear end portion is formed as an engaging portion (13) with en engaging wall (1') on the joining main body (1). The opening inclined surface (14) is deposited at the distal end portion on the inner surface is slidably provided to a projection portion (11) of the supporting component (4), so that the portion having steps (15) can be deposited inside the inner surface. The engaging wall (1') of the joining main body (1), after inserting the sealing component (4), the supporting component (5), the releasing component (which will be described later), and the collar component (12) in the joining main body (1), are formed in such a way that the rear end portion of the joining main body (1) is squeezed and tightened to be pivotally engaged to the engaging portion (13). When the flowing pressure from the flow passage hole (2) is applied to the collar component (12), the resilient sealing component (4) moves toward the axial direction by the raised pressure of the internal flow media which flows from a location between the inner surface of the small diameter chamber (3') and the outer surface of the plastic tubes (P) into the intermediate chamber. The aforementioned movement is accompanied by the collar component (12) which slides backward to the supporting component (5). Therefore, the gradually thinning inclined component (8) slides into contact with the opening inclined surface (14) on the side of the collar component (12). By this action, the cylindrical arm (6') will be bent and it will come into a tight contact with the outer surface of the plastic tubes (P). At the same time, the insertion at the pawl wall (10) will be more effective. There is also a releasing component (16), in which an insertion hole (17) for the plastic tubes (P) is inserted through the shaft core portion. In the releasing component (16), a step portion (18) is to be engaged with the portion having steps (15) of the collar component (12) and its distal end portion will form a distal gradually thinning inclined surface (19) on the outer peripheral surface. Movement of the distal gradually thinning inclined surface (19) along the axial core direction induces the opening inclined surface (9)—being formed by the supporting component (5)—to slide in a lateral direction in order to release the insertion action at the pawl wall (10), which is accomplished with a pressing wall (20). The aforementioned releasing component (16) is also provided inside the collar component (12) with the guard wall (21) which is projecting outward at the rear end portion. Hence, with the above structure, the plastic tubes (P) can be easily taken off by the aforementioned releasing action.

There is also a cylinder receiving component (22) which is deposited inside the connecting side of the plastic tubes (P) along the small diameter chamber (3''), the intermediate chamber (3'), and the large diameter chamber (3) of the joining main body (1) to hold "displacement" of the plastic tubes (P). A slit (23) is also provided over the pressing wall portion (20) of the releasing component (16) so it can be easily assembled to the collar component (12). The component (24) is a ring-formed dust sealing component (24), which is positioned at an engaging location for the portion having steps (15) of the collar component (12) and the step portion (18) of the releasing component (16), in order to eliminate the dust contamination from the ambience, so that the stable supporting action can be maintained even under unfavorable atmospheric conditions.

With the above structure, according to the present invention, the supporting component (5) slides toward the shaft core direction under external forces of insertion and/or pulling out of plastic tubes (P), so that the pawl wall (10) is inserted inside the outer peripheral surface of the plastic tubes (P), and the supporting component (5) is pressed down against this outer peripheral surface by a sliding movement of the collar component (12). This arrangement results in a stable connection of the plastic tubes, so that thinning of the wall thickness of the plastic tubes (P) due to the externally pulling action and the expansion resulting from the internal pressure of the flow media can be prevented and a stable connection without any cracks and fractures can be achieved.

The function of the slit (6) which is formed at the supporting component (5) is to provide flexibility to the cylindrical arm (6') so that the pawl wall (10) can be securely and effectively inserted into the outer peripheral surface of the plastic tubes (P). On the other hand, the slit (23) at the releasing component (16) is provided in order to facilitate an easy operation of assembling of the releasing component (16) to the collar component (12).

In the following, the second embodiment will be described by refering to FIGS. 4 through 7. In this embodiment, on the contrary to the first embodiment, the ring-formed pawl wall (10) is provided in non-contact with the outer peripheral surface of the plastic tubes (P) to be connected. Moreover, since the inner diameter of the ring-formed guard wall (7) is smaller than the outer diameter of the plastic tube (P), at least one of the contact area of the plastic tubes (P) of the ring-formed pawl wall (10), the shape of the contact area of the ring-formed pawl wall (10), or the materials for the ring-formed pawl wall (10) is selectively designed and fabricated so that the inner peripheral surface of the ring-formed guard wall (7) to contact with the outer peripheral surface of the plastic tubes (P) with a certain pre-determined value of sliding friction coefficient.

Description of the rest of the components which are identical to those in the first embodiment (FIGS. 1 through 3) is omitted.

Figure 4:
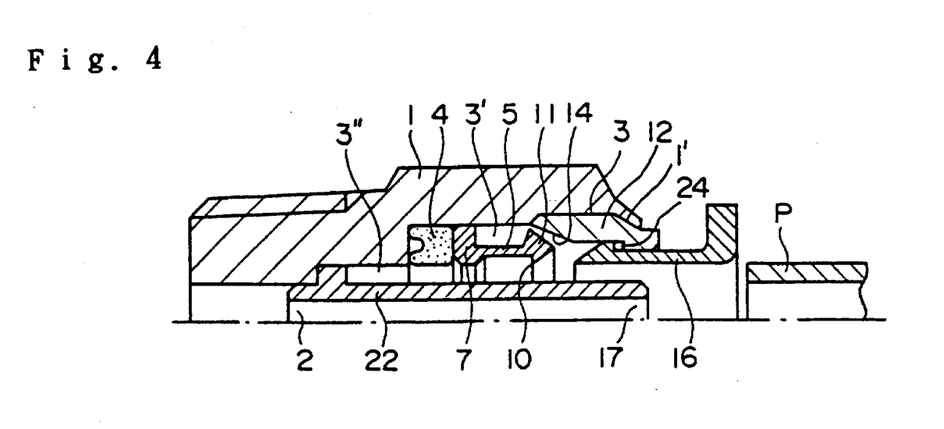
FIG. 4 is a vertical cross sectional view showing the non-contact connection of the plastic tubes according to the second embodiment of the present invention.
Figure 5:
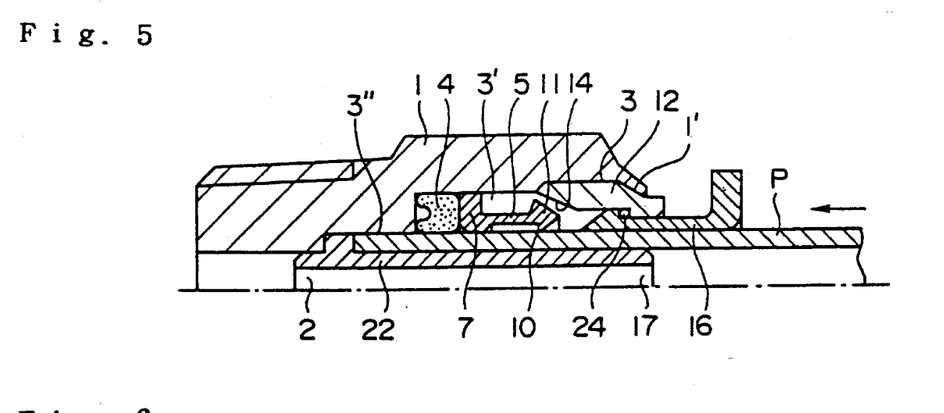
FIG. 5 is a vertical cross sectional view indicating an insertion position of the plastic tubes according to the second embodiment.
Figure 6:
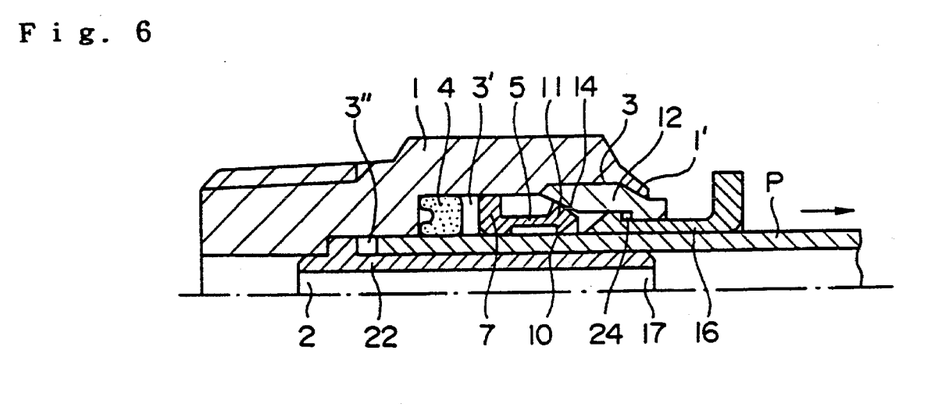
FIG. 6 is a vertical cross sectional view showing how the plastic tubes can be pulled, according to the second embodiment.

When the plastic tube (P) is to be connected with the connecting joint, according to the second embodiment, there will be a change in the situation illustrated from FIG. 4 to FIG. 5. Upon inserting the plastic tubes (P) between the inner peripheral surface of the supporting component (5) and the outer peripheral surface of the cylinder receiving component (22), the ring-formed pawl wall (10) provided on the projection wall (11) of the supporting component (5) is not in contact with the plastic tubes, but the insertion of the plastic tubes (P) will precede. Furthermore, the plastic tubes (P) are in contact with inner peripheral surface of the ring formed guard wall (7) of the supporting component (5) with a certain value of sliding friction coefficient, and supporting component (5) is pushed in by the plastic tubes (P), so that the ring-formed guard wall (7) is in contact with the resilient sealing component (4).

Figure 7:
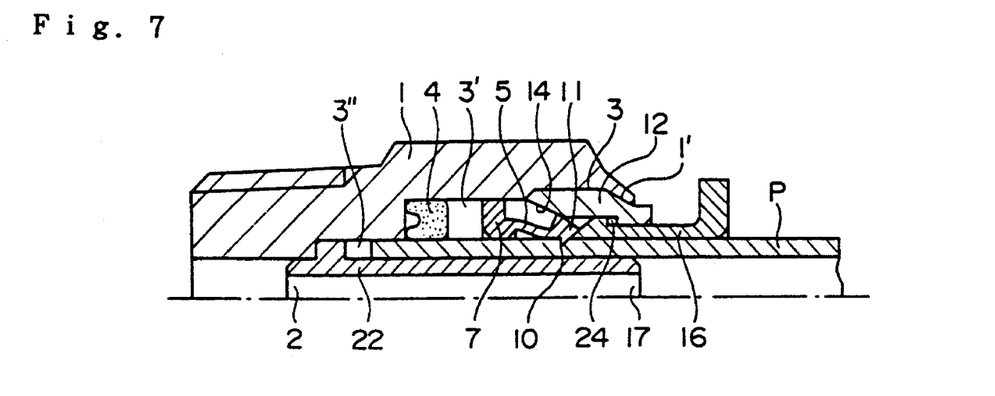
FIG. 7 is a vertical cross sectional view of the plastic tubes in the connecting position according to the second embodiment.

As seen in FIG. 5, when a pulling force is applied to the plastic tubes (P) from a condition where there is a contact between the ring-formed guard wall (7) and the resilient sealing component (4), the ring-formed guard wall (7), which is also in contact with the outer peripheral surface of the plastic tubes (P) under a certain value of sliding friction coefficient, slides toward the pulling off direction, so that the whole body of the supporting component (5) moves to bring in contact the projection wall (11) with the opening inclined surface (14) of the collar component (12). When the ring-formed guard wall (7) slides furthermore along the pulling off direction, the pawl wall (10) of the projection wall (11) is pushed to a lateral direction due to the contact-sliding movement between the opening inclined surface (14) and the gradually thinning inclined surface (8) of the projection wall (11), and the pawl wall (10) is inserted into the outer peripheral surface of the plastic tubes (P) to complete the connection of the plastic tubes (P), as seen in FIG. 7.

In this case, once the pawl wall (10) is inserted into the outer peripheral surface of the plastic tubes (P), the inner peripheral surface of the resilient arm (6') besides the pawl wall (10) and the ring-formed guard wall (7) will be in contact with the outer peripheral surface of the plastic tubes (P). Hence, by sliding the projection wall (11) over the opening inclined surface (14) of the collar component (12), the supporting component (5) will be pressed against the outer peripheral surface of the plastic tubes, resulting in a firm connection between the plastic tubes (P) and the connecting joint of this embodiment.

According to this embodiment, since the pawl wall (10) is in non-contact with the outer peripheral surface of the plastic tubes (P), the wear scratchs on the outer peripheral surface of the plastic tubes (P) due to the insertion action of the pawl wall (10) can be avoided.

Description of other operation and effects or this second embodiment is omitted since they will be identical to those already described for the first embodiment.

The third embodiment of the present invention will be described by refering to FIGS. 8 through 11. According to the third embodiment, on the contrary to the first embodiment, the inner peripheral surface of the ring-formed guard wall (7) of the supporting component (5) and the ring-formed pawl wall (10) are provided on the outer peripheral surface of the plastic tubes (P) in non-contact condition. Moreover, a friction ring (30) is provided which is deposited in contact with the outer peripheral surface of the plastic tubes (P) between the resilient sealing component (4) and the ring formed guard wall (7) under a certain value of sliding friction coefficient. The inner diameter of the friction ring (30) is formed to be smaller than the outer diameter of the plastic tubes (P). At least one of the contact area with the plastic tubes, the shape of the contact area with the plastic tubes, or the material thereof can be selectively designed and fabricated, so that the friction ring (30) will be deposited in contact with the outer peripheral surface of the plastic tubes (P) under a certain value of sliding friction coefficient.

Since the rest of the components are identical to those in the first embodiment, the description thereof is omitted.

Figure 8:
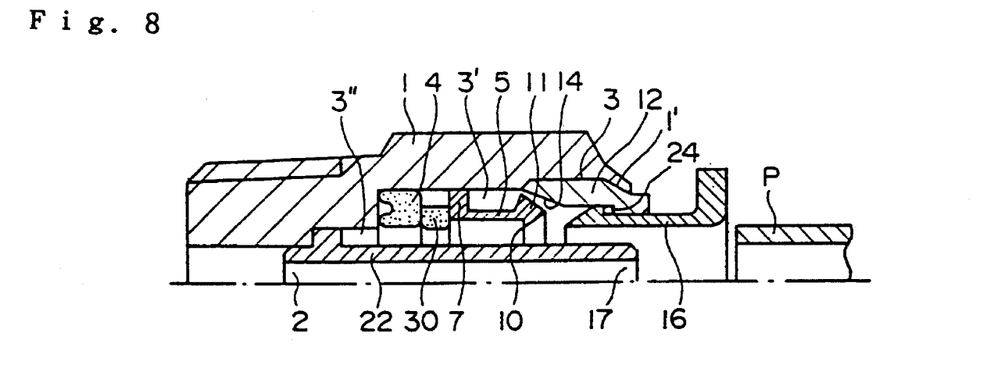
FIG. 8 is a vertical cross sectional view showing the plastic tubes in non-contact condition, according to the third embodiment.
Figure 9:
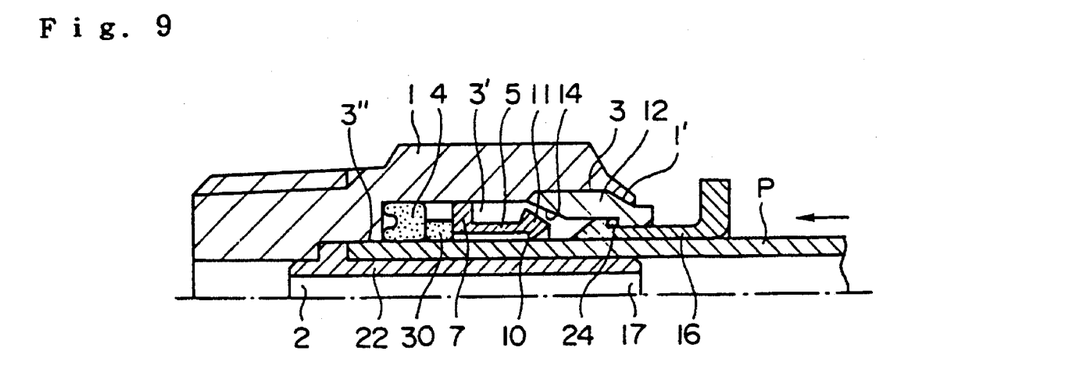
FIG. 9 is a vertical cross sectional view showing the insertion position of the plastic tubes, according to the third embodiment.

When the plastic tubes (P) are to be connected to the connecting joint according to this embodiment, the condition will change from FIG. 8 (which is in non-contact arrangement) to FIG. 9. In FIG. 9, when the plastic tubes (P) are inserted between the inner peripheral surface of the supporting component (5) and the outer peripheral surface of the cylinder receiving component (22), the plastic tubes are not in non-contact with the ring-formed pawl wall (10) being provided at the projection wall (11) of the supporting component (5) and the ring-formed guard wall (7), the insertion of the plastic tubes (P) precedes until the plastic tubes (P) are inserted at the distal end portion of the cylinder receiving component (22).

Figure 10:
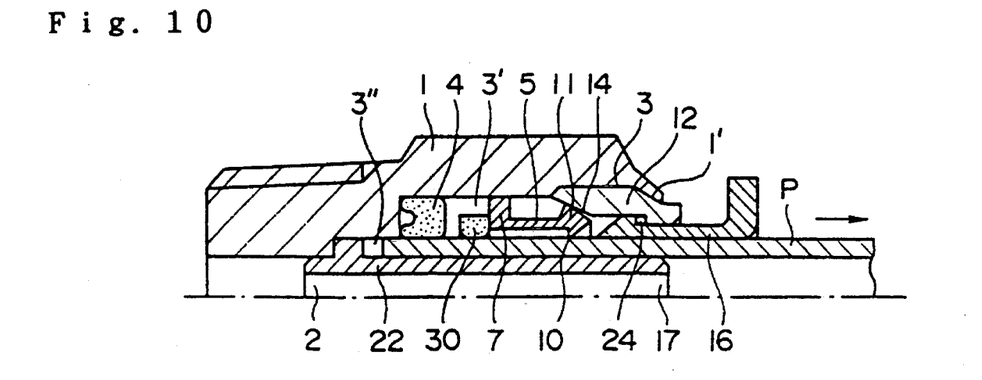
FIG. 10 is a vertical cross sectional view illustrating the pulling out position of the plastic tubes, according to the third embodiment.
Figure 11:
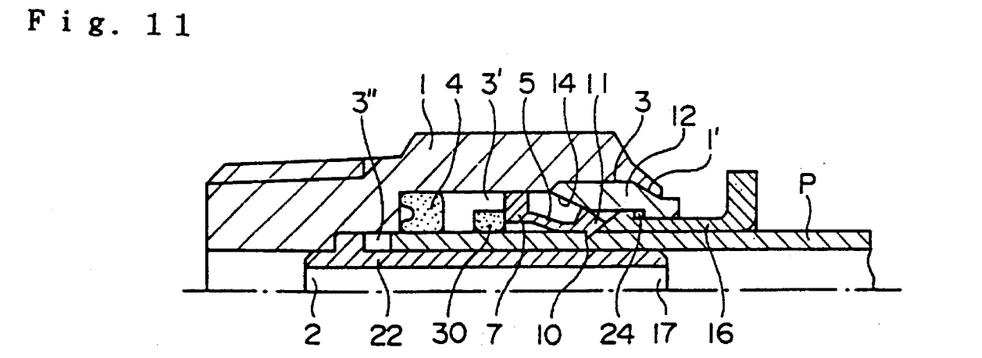
FIG. 11 is a vertical cross sectional view showing the connecting situation of the plastic tubes, according to the third embodiment.

As can be seen in FIG. 10, when the plastic tubes (P) are pulled away from the contact condition thereof with the distal end portion of the cylinder receiving component (22), since the pulling off force will be applied to the the friction ring (30) which is in contact with the outer peripheral surface of the plastic tubes (P) under a certain value of sliding friction coefficient, the supporting component (5) will be moved by the friction ring (30), and the projection wall (11) will slide in contact to the opening inclined surface (14) of the collar component (12). By further sliding, the pawl wall (10) of the projection wall (11) will be pressed into a lateral direction by the sliding action of the opening inclined surface (14) of the collar component (12) and the distal gradually thinning inclined surface (8), and the pawl wall (10) will be inserted inside the outer peripheral surface of the plastic tubes (P) to complete the connection of the plastic tubes (P), as seen in FIG. 11.

Description of the rest of the components which are identical to those in the second embodiment is omitted.

The fourth embodiment will be described by refering to FIGS. 12 through 15. According to the fourth embodiment, on the contrary to the first embodiment, the inner peripheral surface of the ring-formed pawl wall (19) are provided in non-contact with the outer peripheral surface of the plastic tubes (P). The resilient sealing component (4) is provided in contact with the outer peripheral surface of the plastic tubes (P) under a certain value of sliding friction coefficient. At least one of the contact area, the surface pressure, the surface roughness, the shape and the material of the contact area between the resilient sealing component (4) and the intermediate chamber (3') will be selectively designed and fabricated so that the resilient sealing component (4) will be provided in contact with the outer peripheral surface of the plastic tubes (P) under a certain value of sliding friction coefficient.

Description of the rest of the components which are identical to those of the first embodiment is omitted.

Figure 12:
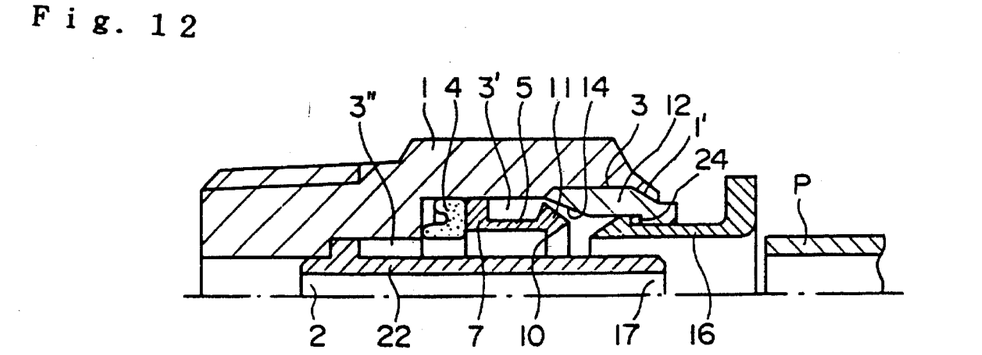
FIG. 12 is a vertical cross sectional view showing the non-contact connecting situation of the plastic tubes, according to the fourth embodiment of the present invention.
Figure 13:
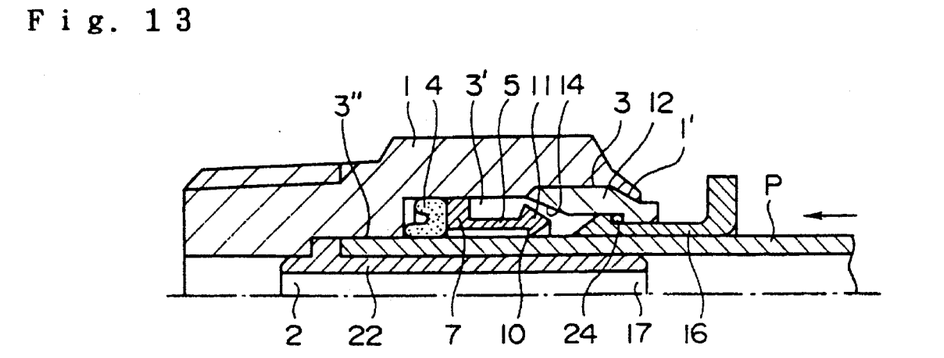
FIG. 13 is a vertical cross sectional view of the insertion position of the plastic tubes, according to the fourth embodiment.

According to the present embodiment, when the plastic tubes (P) are connected to the connecting joint, the condition changes from the non-contact to the connecting joint, the condition changes from the non-contact situation as seen in FIG. 12 to the conditon illustrated in FIG. 13, in which, upon inserting the plastic tubes (P) between the inner peripheral surface of the supporting component (5) and the outer peripheral surface of the cylinder receiving component (22), the plastic tubes (P) are in non-contact with the ring-formed pawl wall (10) and the ring-formed guard wall (7) provided at the projection wall (11) of the supporting component (5), the insertion of the plastic tubes (P) will precede until the plastic tubes (P) are inserted to the distal end portion of the cylinder receiving component (22).

Figure 14:
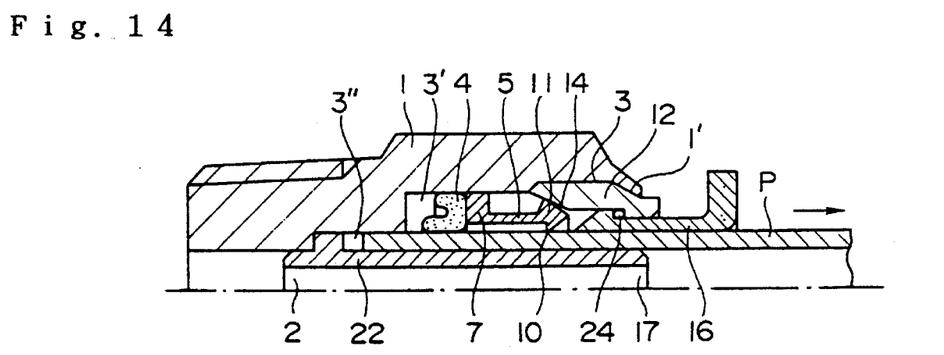
FIG. 14 is a vertical cross sectional view showing the pulling out position of the plastic tubes, according to the fourth embodiment.
Figure 15:
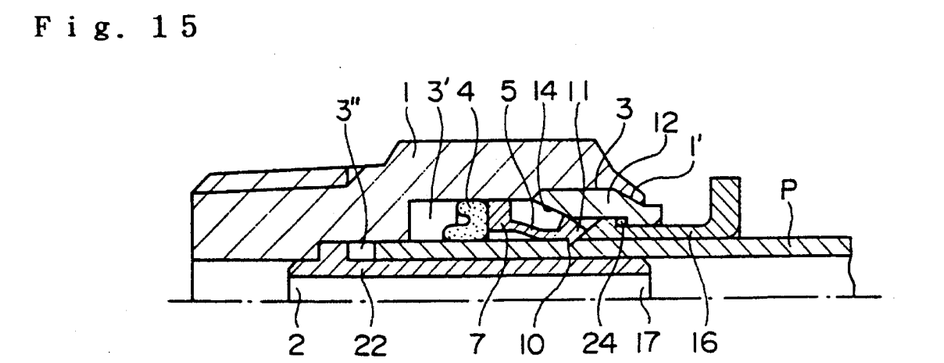
FIG. 15 is a vertical cross sectional view of the connecting situation of the plastic tubes, according to the fourth embodiment.

As seen in FIG. 14, when the plastic tubes (P) are pulled away from the contact condition with the step portion of the cylinder receiving component (22), since the pulling force will be applied to the resilient sealing component (4) which is in contact with the outer peripheral surface of the plastic tube (P), the supporting component (5) will slide through the resilient sealing component (4), and the projection component (11) will come in contact with the opening inclined surface (14) of the collar component (12). Furthermore, when the movement along the pulling direction precedes, the pawl wall (10) of the projection wall (11) will be pressed into a lateral direction because the distal gradually thinning inclined surface (8) slides on the opening inclined surface (14) of the collar component (12), so that the pawl wall (10) is inserted into the outer peripheral surface of the plastic tubes (P), as seen in FIG. 15. to complete to connection of the plastic tubes (P).

Description of the rest of the components which are identical to those in the second embodiment is omitted.

As it has been described in the above, by the connecting joint for plastic tubes according to the present invention, the ring formed guard wall (7) is provided at the distal end portion of the supporting component (5). The collet-shaped cylindrical arm portion (6') which is connected to the pawl (10) is also provided. Furthermore, the connecting joint of the present invention is constructed in such a way that it is in contact with the plastic tubes (P) at the arm portion, and the supporting component can slide along the shaft core direction. Accordingly, thinning of the wall thickness due to the tensile force when an external pulling force is applied on the soft tubes (P) and excess insertion at the insertion portion of the tubes can be effectively controlled to prevent local cracks and fractures of the plastic tubes, so that stable supporting can be achieved constantly at the supporting component (5). At the same time, even if the pressure increases because the internal media flowing from a location between the inner peripheral surface of the small diameter chamber (3') of the joining main body and the outer peripheral surface of the cylinder receiving component (22) or the plastic tubes (P) to the rear side of the resilient sealing component (4), the cylindrical arm (6') will be in tight contact with the outer peripheral surface of the plastic tubes (P), so that a frictional force will be generated, and the ring-formed pawl (10) will be furthermore inserted into the outer peripheral surface of the plastic tubes (P) to enhance the supporting mechanism. Moreover, since the inner peripheral surface of the ring-formed pawl wall can be kept in non-contact with the outer peripheral surface of the plastic tubes because of the frictional force between the inner peripheral surface of the ring-formed guard wall (7), the friction ring (30), or the sealing component (4) and the outer peripheral surface of the plastic tubes; said frictional force can be developed by insertion or connecting of the plastic tubes to the connecting joint. Therefore, wear scratchs on the outer peripheral surface of the plastic tubes can be avoided, and reduction of the sealing efficiency can also be prevented, resulting in an excellent performance of the connecting tubes.

While this invention has been explained with reference to the structure disclosed herein, it is not confined to the details as set forth, but this application is intended to cover modifications and changes as may come within the scope of the following claims.

What is claimed is:

1. A connecting joint for connection to a plastic tube having an outer surface, the outer surface of the tube defining an outer diameter, said joint comprising:

a main body having opposed proximal and distal ends, a flow passage hole extending into said proximal end, at least one chamber between said ends and communicating with said flow passage hole, and an engaging wall extending inwardly at said distal end of said main body and defining a small diameter entry to said chamber;

an annular seal sealingly supported in said chamber of said main body and being dimensioned for sealing contact with the outer surface of the tube;

a support having an annular guard wall slidably supported in said chamber distally of said seal, said annular guard wall being dimensioned to surround the outer surface of said tube, resilient arms projecting distally from said guard wall, projection walls on portions of the respective resilient arms remote from the guard wall, each said projection wall having an outwardly and distally facing inclined surface and an inwardly extending pawl wall, said pawl walls and the annular guard wall defining inside diameters greater than the outside diameter of the tube in an unbiased condition of said resilient arms;

an annular friction ring slidably supported in said chamber between said support and said seal, said annular friction ring having an inner cylindrical surface dimensioned for contact with the outer surface of the tube under a certain value of sliding friction coefficient; and a collar permanently secured in said chamber distally of said support and proximally of and adjacent to said engaging wall of said main body, said collar comprising an inwardly and proximally facing inclined surface slidably engageable with the outwardly and distally facing inclined surface of the support, whereby said tube is insertable into said main body toward said proximate end without contacting said pawl walls and said annular guard wall of said support, and whereby subsequent movement of the inserted tube relative to said main body away from said proximate end urges said friction ring toward said distal end into contact with the support and urges the inclined surface of said projection walls of the support into contact with said inclined surface of said collar for urging said pawl walls inwardly into gripping engagement with the tube.

2. The connecting joint of claim 1, further comprising a releasing component slidably surrounding said tube, said releasing component having a distal portion disposed distally of said main body and a proximal portion slidably disposed in said collar, said proximal portion having an outwardly and proximally facing inclined surface selectively engageable with the pawl walls of the support for urging said pawl walls toward said proximate end and radially outwardly thereby allowing the tube to move distally out of said main body.

3. A connecting joint for connection to a plastic tube having an outer surface, the outer surface of the tube defining an outer diameter, said joint comprising:

a main body having opposed proximal and distal ends, a flow passage hole extending into said proximal end, at least one chamber between said ends and communicating with said flow passage hole, and an engaging wall extending inwardly at said distal end of said main body and defining a small diameter entry to said chamber;

an annular seal sealingly supported in said chamber of said main body and having an inner circumferential surface being dimensioned for sealing contact with the outer surface of the tube under a certain value of sliding friction coefficient;

a support having an annular guard wall slidably supported in said chamber distally of said seal, said annular guard wall having a cylindrical inner surface surrounding the outer surface of said tube, resilient arms projecting distally from said guard wall, projection walls on portions of the respective resilient arms remote from the guard wall, each said projection wall having an outwardly and distally facing inclined surface and an inwardly extending pawl wall, the annular guard wall and the pawl walls being spaced from the outer surface of the tube when the resilient arms are in an unbiased condition; and a collar permanently secured in said chamber distally of said support and proximally of and adjacent to said engaging wall of said main body, said collar comprising an inwardly and proximally facing inclined surface slidably engageable with the outwardly and distally facing inclined surface of the support, whereby said tube is insertable into said main body toward said proximate end without contacting said annular guard wall and said pawl walls, and whereby subsequent movement of the inserted tube relative to said main body away from said proximate end urges said seal into contact with the support and urges the inclined surfaces of said projection walls of the support into contact with said inclined surface of said collar for urging said pawl walls inwardly into gripping engagement with the tube.

4. The connecting joint of claim 3, further comprising a releasing component slidably surrounding said tube, said releasing component having a distal portion disposed distally of said main body and a proximal portion slidably disposed in said collar, said proximal portion having an outwardly and proximally facing inclined surface selectively engageable with the pawl walls of the support for urging said pawl walls toward said proximate end and radially outwardly thereby allowing the tube to move distally out of said main body.

5. A connecting joint for connection to a tube having an outer surface, said joint comprising:

a main body having opposed proximal and distal ends, a flow passage hole extending into said proximal end, at least one chamber between said ends and communicating with said flow passage hole, and an engaging wall extending inwardly at said distal end of said main body and defining a small diameter entry to said chamber;

an annular seal sealingly supported in said chamber of said main body and being dimensioned for sealing contact with the outer surface of the tube;

a support having an annular guard wall slidably supported in said chamber distally of said seal, said annular guard wall having a cylindrical inner surface surrounding and frictionally engaging the outer surface of said tube, resilient arms projecting distally from said guard wall, projection walls on portions of the respective resilient arms remote from the guard wall, each said projection wall having an outwardly and distally facing inclined surface and an inwardly extending pawl wall, the pawl walls being spaced from the outer surface of the tube when the resilient arms are in an unbiased condition; and a collar permanently secured in said chamber distally of said support and proximally of and adjacent to said engaging wall of said main body, said collar comprising an inwardly and proximally facing inclined surface slidably engageable with the outwardly and distally facing inclined surface of the support, whereby said tube is insertable into said distal end of said main body through said collar, through said support and through said seal, and whereby subsequent movement of said tube and support relative to said main body away from said proximate end urges said inclined surfaces of said projection walls of said support into contact with said inclined surface of said collar and thereby urges said pawl walls inwardly into gripping engagement with the tube.

6. The connecting joint of claim 5 further comprising a cylinder supported in said main body and extending centrally through said chamber to a location where said pawl walls are radially aligned with said cylinder, said cylinder being dimensioned for slidable insertion into the tube, whereby said cylinder enables support of the tube at locations engageable by said pawl walls.

7. The connecting joint of claim 5 further comprising a releasing component slidably surrounding said tube, said releasing component having a distal portion disposed distally of said main body and a proximal portion slidably disposed in said collar, said proximal portion having an outwardly and proximally facing inclined surface selectively engageable with the pawl walls toward said proximate end and of the support for urging said pawl walls radially outwardly thereby allowing the tube to move distally out of said main body.

8. The connecting joint of claim 7 wherein axially extending slits are provided in said proximal portion of the releasing component.

9. The connecting joint of claim 7 wherein an annular dust sealing component is provided between said collar component and the releasing component.

* * * * *